(12) United States Patent
Register et al.

(10) Patent No.: US 10,303,039 B2
(45) Date of Patent: May 28, 2019

(54) SAW OPTICAL MODULATORS WITH SENSE TRANSDUCERS

(71) Applicant: The Charles Stark Draper Laboratory, Inc., Cambridge, MA (US)

(72) Inventors: Joseph J. Register, Cambridge, MA (US); Gregg E. Favalora, Bedford, MA (US); Ian W. Frank, Arlington, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 15/938,684

(22) Filed: Mar. 28, 2018

(65) Prior Publication Data
US 2018/0284563 A1  Oct. 4, 2018

Related U.S. Application Data

(60) Provisional application No. 62/477,511, filed on Mar. 28, 2017.

(51) Int. Cl.
*G02B 27/22* (2018.01)
*G03H 1/22* (2006.01)
(Continued)

(52) U.S. Cl.
CPC .......... *G02F 1/335* (2013.01); *G02B 27/225* (2013.01); *G03H 1/02* (2013.01); *G03H 1/2294* (2013.01); *G10K 11/002* (2013.01); *G10K 11/178* (2013.01); *G10K 11/36* (2013.01); *G02B 6/005* (2013.01); *G02B 6/0045* (2013.01); *G02B 6/0078* (2013.01); *G02B 6/105* (2013.01); *G02B 6/12004* (2013.01); *G02B 2006/0098* (2013.01); *G02B 2006/12085* (2013.01); *G02B 2006/12104* (2013.01); *G02B 2006/12107* (2013.01); *G02F 1/0353* (2013.01); *G02F 1/125* (2013.01); *G02F 2201/05* (2013.01); *G02F 2201/18* (2013.01); *G02F 2201/302* (2013.01); *G02F 2201/34* (2013.01); *G02F 2203/023* (2013.01);
(Continued)

(58) Field of Classification Search
None
See application file for complete search history.

(56) References Cited

U.S. PATENT DOCUMENTS

| | | | |
|---|---|---|---|
| 4,011,526 A | 3/1977 | Kinsman | |
| 4,815,802 A * | 3/1989 | Nakamura | G02F 1/335 333/145 |

(Continued)

OTHER PUBLICATIONS

Byrnes, S.J., et al. "Designing large, high-efficiency, high-numerical-aperture, transmissive meta-lenses for visible light," Opt. Exp., 24 (5): 5110-5124 (2016).

(Continued)

*Primary Examiner* — Jerry Rahll
(74) *Attorney, Agent, or Firm* — HoustonHogle LLP

(57) ABSTRACT

An electro-holographic light field generator device comprises surface acoustic wave (SAW) optical modulators arranged in different directions. Specifically, some embodiments have SAW modulators arranged in pairs, nose-to-nose with each other, and have output couplers that provide face-fire light emission. These SAW modulators also possibly include SAW sense transducers and/or viscoelastic surface material to reduce crosstalk.

16 Claims, 16 Drawing Sheets

(51) Int. Cl.
| | |
|---|---|
| G03H 1/02 | (2006.01) |
| G02B 6/12 | (2006.01) |
| G02B 6/10 | (2006.01) |
| G02B 6/00 | (2006.01) |
| F21V 8/00 | (2006.01) |
| G02F 1/335 | (2006.01) |
| G10K 11/36 | (2006.01) |
| G10K 11/00 | (2006.01) |
| G10K 11/178 | (2006.01) |
| G02F 1/035 | (2006.01) |
| G02F 1/125 | (2006.01) |

(52) U.S. Cl.
CPC ...... *G02F 2203/07* (2013.01); *G02F 2203/22* (2013.01); *G02F 2203/24* (2013.01); *G02F 2203/28* (2013.01); *G02F 2203/58* (2013.01); *G03H 2001/0224* (2013.01); *G03H 2001/2292* (2013.01); *G03H 2223/16* (2013.01); *G03H 2223/17* (2013.01); *G03H 2225/11* (2013.01); *G03H 2225/21* (2013.01); *G03H 2225/34* (2013.01); *G03H 2225/36* (2013.01); *G03H 2225/55* (2013.01); *G10K 11/17873* (2018.01); *G10K 11/17875* (2018.01)

(56) References Cited

U.S. PATENT DOCUMENTS

| | | | |
|---|---|---|---|
| 5,187,756 | A | 2/1993 | Shiba et al. |
| 7,847,869 | B2 | 12/2010 | Nelson et al. |
| 2007/0258267 | A1 | 11/2007 | Huang et al. |
| 2011/0164434 | A1 | 7/2011 | Derichs |
| 2014/0300695 | A1 | 10/2014 | Smalley et al. |
| 2015/0160530 | A1 | 6/2015 | Han et al. |
| 2016/0223988 | A1 | 8/2016 | Bove, Jr. et al. |

OTHER PUBLICATIONS

Datta, B.C., et al. "Direct-laser metal writing of surface acoustic wave transducers for integrated-optic spatial light modulators in lithium niobate," Proc. SPIE Adv. Fab. Tech. For Micro/Nano Optics and Photonics X, 10115 (2017).
Geng, J., "Three-dimensional display technologies," Advances in Optics and Photonics, 5: 456-535 (2013).
Hamidon, M. N., et al."Sensing Materials for Surface Acoustic Wave Chemical Sensors," Progresses in Chemical Sensor; Edited by Wen Wang: 161-179 (2016).
Hinkov, V.P., et al. "Collinear Acoustooptical TM-TE Mode Conversion in Proton Exchanged Ti:LiNbO3 Waveguide Structures," J. Lightwave Tech., 6(6): 903-908 (1988).
Jolly, S., et al. "Computation of Fresnel holograms and diffraction-specific coherent panorama grams for full-color holographic displays based on leaky-mode modulators," Proc. SPIE Practical Holography XXIX, 9386, 93860A (Mar. 10, 2016).
Jolly, S., et al. "Near-to-eye electroholography via guided-wave acousto-optics for augmented reality," Proc. of SPIE vol. vol. 10127. 2017, (p. 101270J).
Kulick, J.H., et al., "Partial pixels: a three-dimensional diffractive display architecture," JOSA A, 12(1), 73-83 (1995).
Lucente, M., "Computational holographic bandwidth compression," IBM Systems Journal, 35(3 & 4): 349-365 (1996).
Matteo, A.M., et al., "Collinear Guided Wave to Leaky Wave Acoustooptic Interactions in Proton-Exchanged LiNbO3 Waveguides, IEEE Trans. on Ultrasonics, Ferroelectrics, and Frequency Control," 47(1): 16-28 (2000).
McLaughlin, S., et al., "Optimized guided-to-leaky-mode device for graphics processing unit controlled frequency division of color," Appl. Opt., 54(12): 3732-3736 (2015).
Onural, L., et al. "New high-resolution display device for holographic three-dimensional video: principles and simulations," Optical Engineering, 33(3):835-844 (1994).
Pan, Y., et al. "A Review of Dynamic Holographic Three-Dimensional Display: Algorithms, Devices, and Systems, IEEE Transactions on Industrial Informatics," 12(4), 1599-1610 (2016).
Qaderi, K., et al. "Leaky-mode waveguide modulators with high deflection angle for use in holographic video displays," Opt. Expr., 24(18): 20831-20841 (2016).
Smalley, D.E., et al. "Anisotropic leaky-mode modulator for holographic video displays," Nature, 498, 313-317 (2013).
Savidis, N., et al. "Progress in fabrication of waveguide spatial light modulators via femtosecond laser micromachining," Proc. of SPIE vol. vol. 10115 (2017).
Smithwick, Q.Y., et al. "Interactive holographic stereograms with accommodation cues, Practical Holography XXIV: Materials and Applications," ed. Hans I. Bjelkhagen and Raymond K. Kostuk, SPIE (2010).
Taillaert, D., et al., "An out-of-plane grating coupler for efficient butt-coupling between compact planar waveguides and single-mode fibers," IEEE Journal of Quantum Electronics, 38(7), 949-955 (2002).
Tsai, C.S., et al. "Guided-Wave Two-Dimensional Acousto-Optic Scanner Using Proton-Exchanged Lithium Niobate Waveguide," Fiber and Integrated Optics, 17: 157-166 (1998).
Truxal, S.C., et al. "Design of a MEMS tunable polymer grating for single detector spectroscopy," International Journal of Optomechatronics, 2.2: 75-87 (2008).
Zhou, G., et al. "Genetic local search algorithm for optimization design of diffractive optical elements," Appl. Opt., 38(20): 4281-4290 (1999).
Mizeikis, V., et al., "Direct Laser Writing: Versatile Tool for Microfabrication of Lithium Niobate," Journal of Laser Micro/Nanoengineering, 7(3), 345-350 (2012).
Van Erps, J., et al. "Discrete out-of-plane coupling components for printed circuit board-level optical interconnections," IEEE Photonics Technology Letters, 19 (21): 1753-1755 (2007).
Aschwanden, M., et al. "Diffractive transmission grating tuned by dielectric elastomer actuator," IEEE Photonics Technology Letters, 19(14), 1090-1092 (2007).
Benes, E., et al. "Comparison between BAW and SAW sensor principles," IEEE Trans. on Ultrasonics, Ferroelectronics, and Frequency Control, 45(5): 1314-1330 (1998).
Jolly, S., et al., "Progress in transparent flat-panel holographic displays enabled by guided-wave acousto-optics," Proc. SPIE 10558, Practical Holography XXXII: Displays, Materials, and Applications,105580L-1-105580L-7 (2018).
Partial International Search Report of the International Searching Authority, dated Jul. 5, 2018, from International Application No. PCT/US2018/024853, filed on Mar. 28, 2018. 14 pages.
Partial International Search Report of the International Searching Authority, dated Jul. 5, 2018, from International Application No. PCT/US2018/024856, filed on Mar. 28, 2018. 14 pages.
Chung, M.H., et al., "The Design of Temperature-Compensated Surface Acoustic Wave Oscillator," http://www.wseas.us/e-library/conference/2005athens/cscc/papers/497-309.pdf (2005).
U.S. Appl. No. 15/938,684, filed Mar. 28, 2018.
International Search Report and Written Opinion of the International Searching Authority, dated Jul. 5, 2018, from International Application No. PCT/US2018/024853, filed on Mar. 28, 2018. 21 pages.
International Search Report and Written Opinion of the International Searching Authority, dated Aug. 31, 2018, from International Application No. PCT/US2018/024856, filed on Mar. 28, 2018. 21 pages.

\* cited by examiner

SAW OPTICAL MODULATORS WITH SENSE TRANSDUCERS

RELATED APPLICATIONS

This application claims the benefit under 35 USC 119(e) of U.S. Provisional Application No. 62/477,511, filed on Mar. 28, 2017, which is incorporated herein by reference in its entirety.

BACKGROUND OF THE INVENTION

A number of proposed autostereoscopic (naked-eye) 3D displays or, more broadly, light field generator architectures utilize a variety of scanning, diffraction, space-multiplexing, steered illumination, and other techniques. One category, electro-holographic displays, relies principally on diffractive phenomena to shape and steer light. Examples of electro-holographic displays are described in: Jason Geng, *Three-dimensional display technologies*, Advances in Optics and Photonics, 5, 456-535 (2013). (see pp. 508-516) and Yijie Pan et al., *A Review of Dynamic Holographic Three-Dimensional Display: Algorithms, Devices, and Systems*, IEEE Transactions on Industrial Informatics, 12(4), 1599-1610 (August 2016). Electro-holographic light field generators hold the promise of projecting imagery with the ultimate in realism: curved optical wavefronts, which can genuinely replicate the real world. Such displays can theoretically provide nearly perfect characteristics of visual depth information, color rendering, optical resolution, and smooth transitions as viewers changes their location. So far, displays built on this technology have not achieved this theoretical level of performance.

One specific device category that provides controllable sub-holograms from which a light field can be constructed uses what is known as a surface acoustic wave (SAW) modulator. A SAW is generated in a piezoelectric substrate under radio frequency (RF) excitation. This creates a time-varying diffracting region that interact with input light in the waveguide. This causes at least some of the light to change from a guided mode within the waveguide to a leaky mode that exits the waveguide. This is described more fully, for example, in:

Onural et al., "New high-resolution display device for holographic three-dimensional video: principles and simulations," Optical Engineering, vol. 33(3), pp. 835-44 (1994);

Matteo et al., *Collinear Guided Wave to Leaky Wave Acoustooptic Interactions in Proton-Exchanged LiNbO3 Waveguides*, IEEE Trans. on Ultrasonics, Ferroelectrics, and Frequency Control, 47(1), 16-28 (January 2000);

Smalley et al., Anisotropic leaky-mode modulator for holographic video displays, Nature, 498, 313-317 (20 Jun. 2013);

U.S. Pat. App. Publ. US 2014/0300695; Full Parallax Acousto-Optic/Electro-Optic Holographic Video Display;

Gneiting et al., *Optimizations for Robust, High-Efficiency, Waveguide-Based Holographic Video*, Industrial Informatics (INDIN), 2016 IEEE 14th International Conference on, (19-21 Jul. 2016);

Hinkov et al., Collinear Acoustooptical TM-TE Mode Conversion in Proton Exchanged Ti:LiNbO3 Waveguide Structures, J. Lightwave Tech., vol. 6(6), pp. 900-08 (1988);

McLaughlin et al., Optimized guided-to-leaky-mode device for graphics processing unit controlled frequency division of color, Appl. Opt., vol. 54(12), pp. 3732-36 (2015);

Qaderi et al., Leaky-mode waveguide modulators with high deflection angle for use in holographic video displays, Opt. Expr., vol. 24(18), pp. 20831-41 (2016); and Savidis et al., Progress in fabrication of waveguide spatial light modulators via femtosecond laser micromachining, Proc. of SPIE Vol. 10115, (2017).

FIG. 1 shows an exemplary prior an SAW optical modulator 100. It can be used to deflect light of the same or different colors/wavelengths 101a, 101b, 101c from guided modes by different angles simultaneously, or serially, in time.

The modulator 100 comprises a substrate 120 in which or on which an optical waveguide 102 has been formed. The input light 101a, 101b, and/or 101c at one or more wavelengths ($\lambda_1$, $\lambda_2$, $\lambda_3$) enters waveguide 102. An in-coupling device 106 is used to couple the input light 101 carried in an optical fiber, for example, into the waveguide 102. Examples of in-coupling devices 106 include in-coupling prisms, gratings, or simply butt-coupling between an optical fiber or light in free-space and the waveguide 102. The input light 101 is launched into a guided mode upon entry into the waveguide 102. Commonly, the TE (transverse electric) mode is guided.

In such a SAW modulator 100, the waveguide 102, e.g., slab waveguide, is typically created in a lithium niobate substrate 120 by proton-exchange. Transducers (e.g., interdigital transducers (IDTs)) 110 are written on an aluminum side of the substrate 120. The transducers 110 induce surface acoustic waves (SAWs) 140 in the substrate 120 that propagate along the waveguide 102. Such transducers 110 are often driven electrically, e.g. using a 300-500 MHz radio frequency (RF) drive signal 130.

The light interacts with the surface acoustic wave 140. The result of this interaction between the SAW 140 and the light in the waveguide 102 is that a portion of the guided light is polarization-rotated, out of the guided mode and into a leaky mode having the transverse magnetic (TM) polarization. The light then exits the waveguide 102 as leaky-mode or diffracted light 162 and enters substrate 120 at angle $\varphi$, measured from grazing 77. At some point this diffracted light 162 exits the substrate 120 at an exit face, which is possibly through the substrate's distal face 168 or end face 170 (as shown) as exit light 150 at an exit angle of $\theta$. The range of possible exit angles $\theta$ comprises the angular extent, or exit angle fan, of the exit light 150.

Practical electronic constraints and materials properties often limit the resulting angular deflection of SAW devices. Qaderi (2016) reports that a total output angle of approximately 20° can be achieved, significantly lower than the field of view of contemporary 2D displays that approach 180°. Existing electro-holographic 3D displays using SAW devices have attempted to increase the exit angle fan of the diffracted output light 150 in various ways such as by optimizing various modulator parameters to increase the useful bandwidth of the RF driver such as waveguide depth and IDT design (in published systems, the output angle is a function of IDT drive frequency), by using edge-emitting modulators having "right-angle" edges, by doubling the angle fan via waveguides on both sides of the wafer, and/or by demagnification (i.e. using a large lens to demagnify an area of numerous modulators to provide a smaller visible display area having larger field of view). But it does not appear that any of these are adequate to achieve an angle fan as high as 90° in any sort of flat form-factor.

SUMMARY OF THE INVENTION

Embodiments of the present invention are directed to SAW modulators and electro-holographic light field generator devices constructed from those modulators.

The modulators use sense transducers to detect SAWs in the substrate. They can be used to control and optimize the generation of the SAWs. They can also be used to dampen the SAW to avoid crosstalk between modulators, for example.

In general, according to one aspect, the invention features a SAW optical modulator. It comprises a substrate, a waveguide in the substrate, and transducers for generating SAWs for diffracting light out of the waveguide and sensing SAWs in the substrate.

Some embodiments have separate SAW transducers and sense transducers.

However, other embodiments include a switch for operating the transducers in a SAW generation or SAW sensing mode.

Some examples have a feedback circuit for driving the transducers to dampen SAWs in the substrate. Other embodiments use a feedforward circuit.

Typically, the transducers are upstream and downstream of an output coupling region of the waveguide.

In general, according to one aspect, the invention features a light field generator device. It comprises a substrate, an array of waveguides extending across the substrate; and an array of surface acoustic wave (SAW) modulators formed in the substrate, the SAW modulators including transducers for generating SAWs for diffracting light out of the waveguides and sensing SAWs in the substrate.

In general, according to one aspect, the invention features a method for controlling a SAW optical modulator. This method comprises driving transducers for generating surface acoustic waves (SAWs) for diffracting light out of a waveguide and sensing SAWs in the substrate with the transducers.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
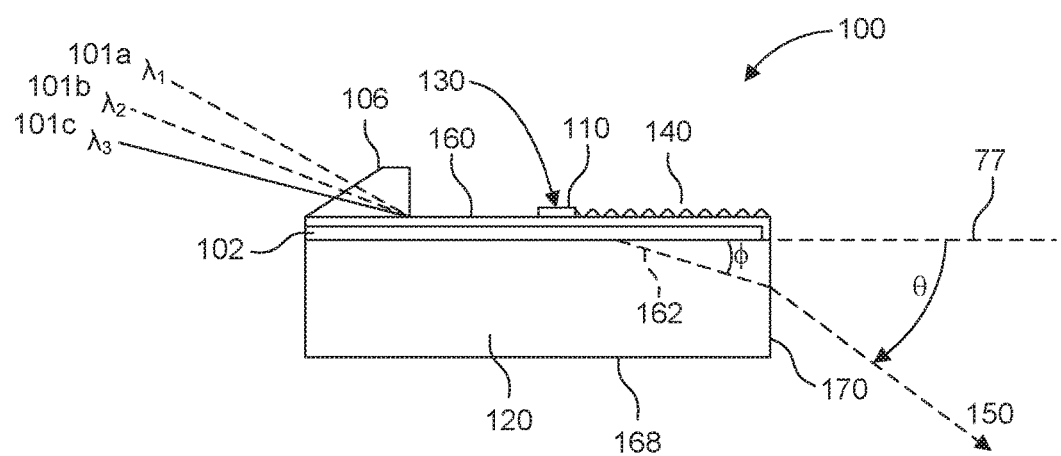
FIG. 1 shows a side view of a prior art SAW modulator.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Different embodiments of the present invention described herein below can address several drawbacks that are present in existing light field generators. These drawbacks are of particular importance to their use as 3D display systems and other systems that involve light field generation. One such drawback concerns the fact that existing SAW devices often have an insufficiently broad exit fan of the output light field, and that in most cases, the diffracted output light field is centered inconveniently away from the normal to the device's exit face, such as the distal face. Embodiments of the present invention can be used to increase the field of view (FOV) of a diffractive 3D display system using modulators in a "face-fire" configuration by combining modulators oriented in different directions to effectively increase the exit fan. This improves displays in at least two ways: centering the output angle of the output light field about convenient direction (e.g., the device normal), and broadening the angular field of view of the output light field so that it becomes more useful for a variety of applications.

Figure 2:
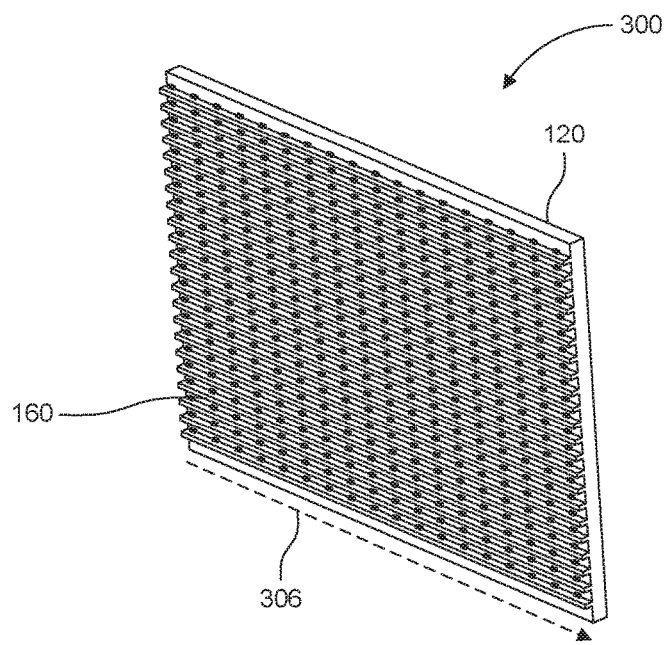
FIG. 2 is an elevated perspective view of an electro-holographic light field generator device according to an embodiment of the present invention.
Figure 3:
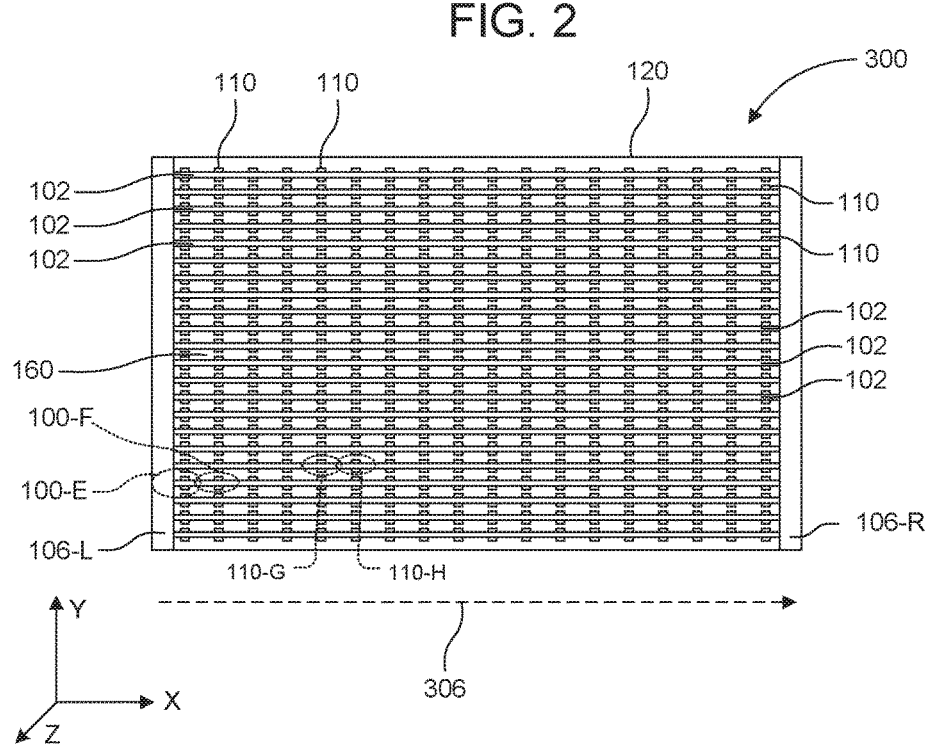
FIG. 3 is a front plan view of the light field generator device, looking down on z-axis.

FIGS. 2 and 3 show an elevated perspective view and front view respectively of an electro-holographic light field generator device 300 in the specific form of a 3D display module according to an embodiment of the present invention. A 3D display system, for example, would employ one or more such devices 300 in possibly a regular grid in order to generate a light field of sufficient extent for a desktop or wall-mounted 3-D computer display, a head-worn near-eye virtual reality/augmented reality/mixed reality display, a virtual sand table, or the walls of a room creating immersive imagery.

An optical substrate 120 of the device 300 has a proximal face 160 (shown facing in FIGS. 2 and 3) and is characterized by a directional reference line 306 along the proximal face 160. In the specific embodiment shown, the proximal face 160 is planar, but that is not necessarily the case in other specific embodiments. For example, in some embodiments the modulator face may be convex or concave, or concave spherical curvature or convex spherical curvature.

The optical substrate 120 may be made, for example, of a suitable piezoelectric material such as lithium niobate ($LiNbO_3$), quartz ($SiO_2$), or lithium tantalate ($LiTaO_3$) following known processes, e.g., Smalley et al, 2013. Many other materials and design choices are available including other piezoelectric materials and different crystallographic orientations, and waveguide architectures such as planar, ridge, rib, embedded, immersed, and bulged. Doping such as MgO-doped lithium niobate may be useful in some cases.

The optical substrate 120 may range in x- or y-dimensions of 1 centimeter (cm) (for near-eye display applications) to over 20 cm on each of the x and y dimensions (for larger displays at larger viewing distances). Typically, the thickness (z-dimension) of the optical substrate 120 ranges from 0.5 mm to 3 mm.

At opposing ends of the optical substrate 120 are left and right light in-coupling devices 106-L, 106-R that are utilized to produce (counter-propagating) light vectors within each of a plurality of waveguides 102 that are distributed across the proximal face 160 of the optical substrate 120 in an orientation defined with relation to the reference line 306. Corresponding SAW transducers 110 generate SAWs in the substrate that interact with the waveguide light.

The illustrated electro-holographic light field generator 300 comprises a two dimensional array of SAW modulators 100. Specifically, in the illustrated embodiment, there are twenty-two shared waveguides 102 extending parallel to each other along the y-axis of the device 300. On the other hand, there are eighteen shared SAW transducers 110 along the x-axis direction of the device 300 for each of the waveguides 102.

Figure 4A:
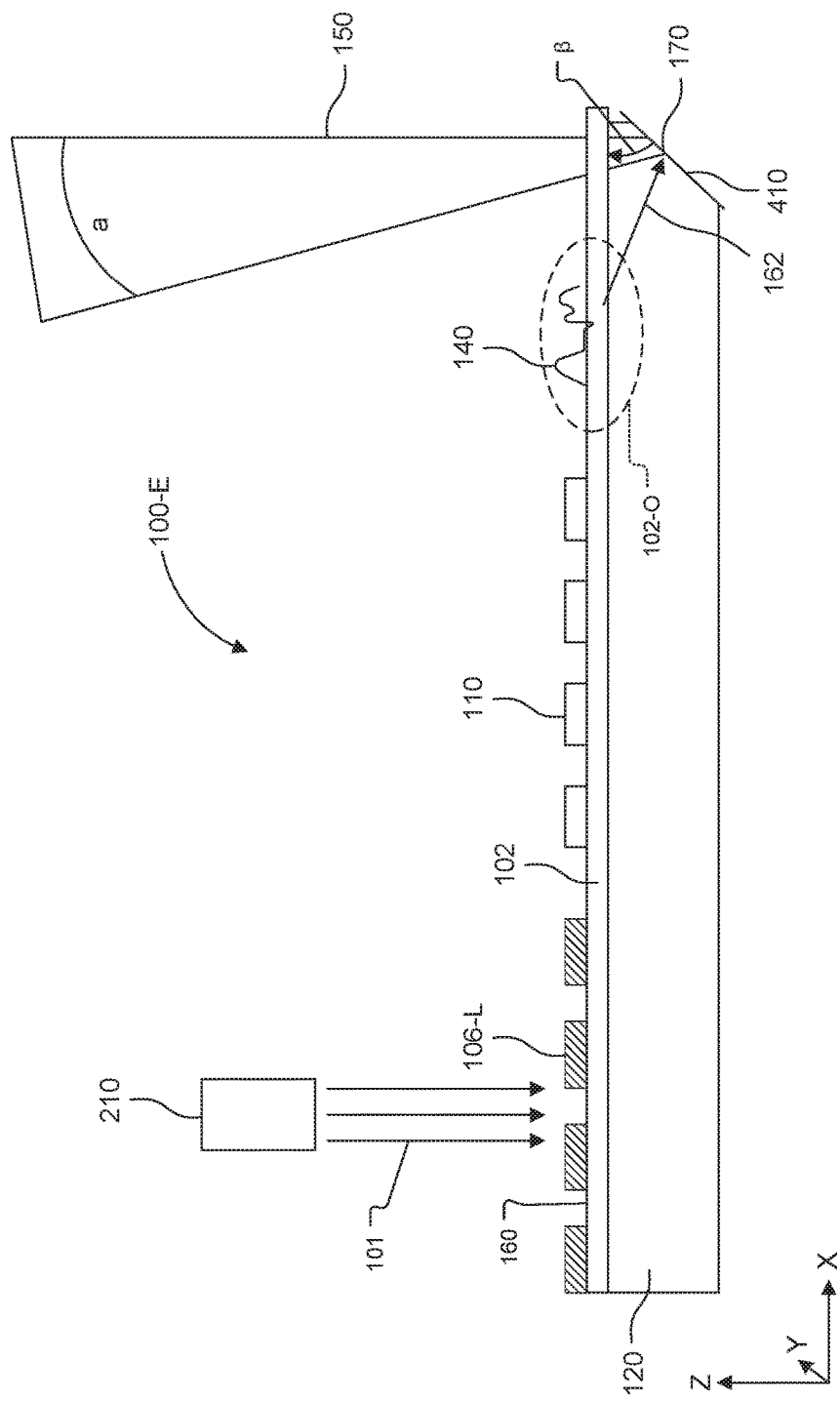
FIG. 4A is a side cross-sectional view of a SAW optical modulator in the light field generator device.
Figure 4B:
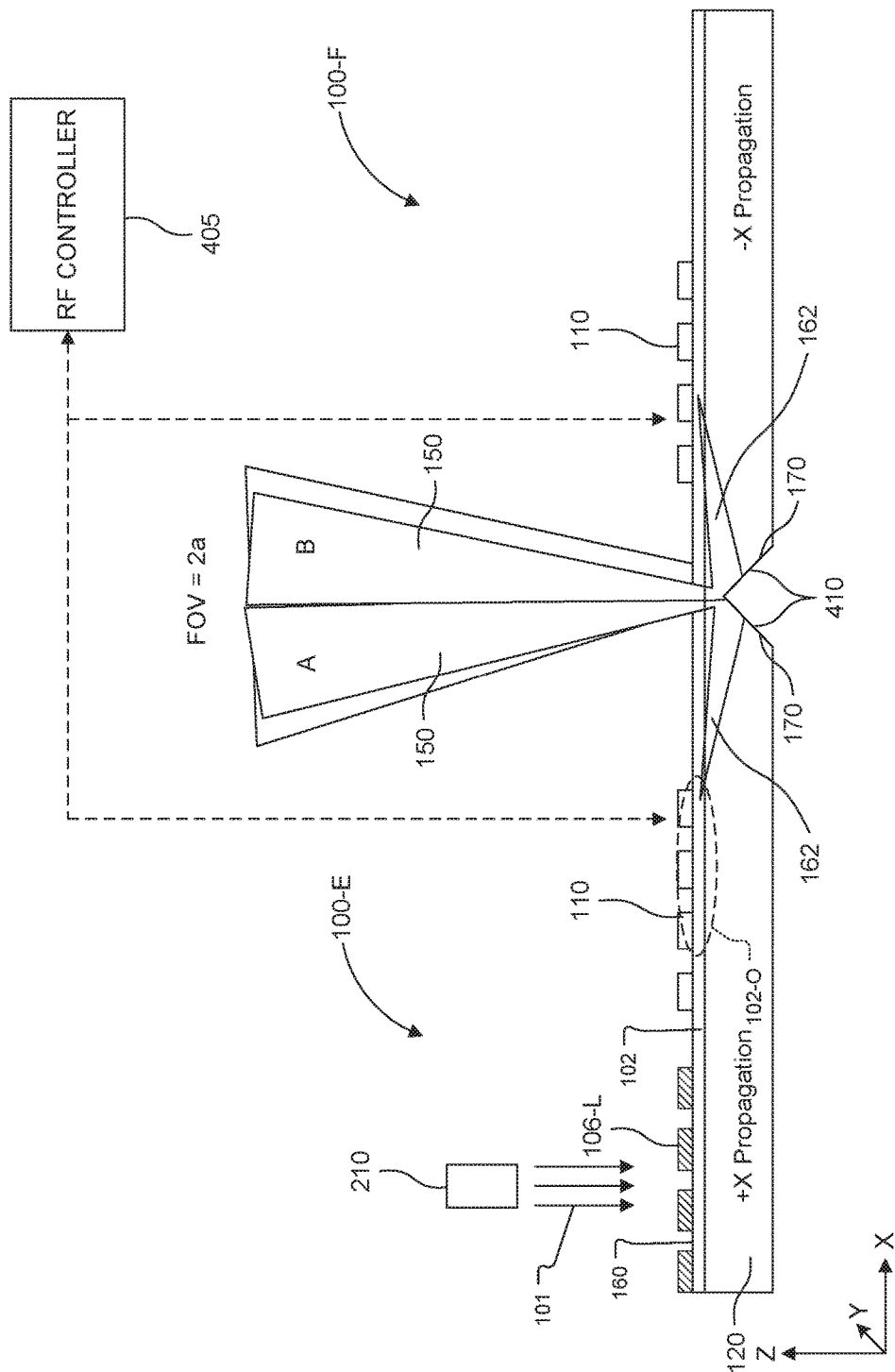
FIG. 4B is a side cross-sectional view of a cooperating pair of SAW optical modulators in the light field generator device.
Figure 4C:
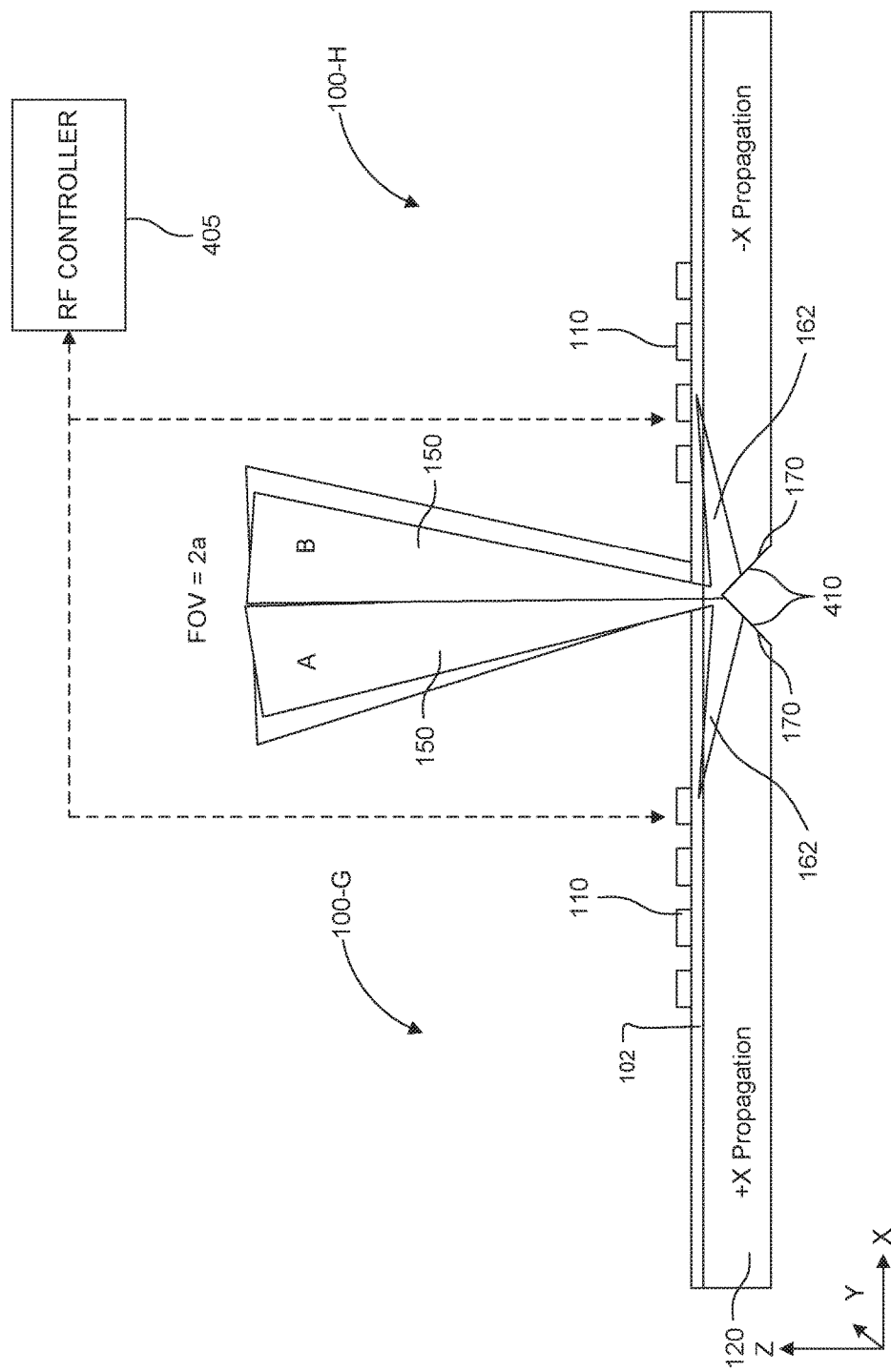
FIG. 4C is a side cross-sectional view of a cooperating pair of SAW optical modulators in the center of the array of the light field generator device.

FIG. 4A is a side cross-sectional view of one of the modulators along the far left side of the electro-holographic light field generator 300 such as modulator 100-E, and FIG. 4B shows how multiple optical modulators are arranged in cooperating pairs 100-E, 100-F, along the edges of the generator 300. FIG. 4C shows another exemplary cooperating pair of modulators 100-G, 100-H from the center of the device 300.

The optical modulators 100 share waveguides 102 defined within the optical substrate 120. A light source 210 provides input light 101 through the in-coupling device 106-L (e.g., an optical grating or prism) to the waveguide 102 for TE-like (transverse electric) guided mode confinement of waveguide light within the waveguide 102.

There is at least one surface acoustic wave (SAW) transducer 110 (e.g., an interdigital transducer (IDT)) for each modulator 100. The transducers, in response to the RF input, piezoelectrically generate SAWs 140 in the modulator's substrate 120 that propagate collinearly, in one example, with the waveguide 102 and are timed with the pulses of waveguide light to interact to convert a portion of the light to transverse magnetic (TM) polarization.

Birefringence of the waveguide 102 and the optical substrate 120 (and/or the wave-vector change from the interaction) causes the deflection of light in the waveguide 102 to create a leaky mode fan of diffracted light 162. In typical operation, the light is timed with the SAW generation so that the waveguide light is diffracted out of the waveguide within a defined waveguide output coupling region 102-O of the waveguide 102 in the optical substrate 120.

The SAW transducers 110 can occupy various specific locations and specific orientations with respect to the waveguide 102; for example. The illustrated embodiment has the SAW transducers 110 near the in-coupling device 106-L (see FIG. 4B).

When integrated into the electro-holographic light field generator 300, there could be multiple SAW transducers 110 for each light source 210/in-coupling device 106/waveguide 102 and upstream of an output coupler. Then each of the SAW transducers 110 that are distributed along the waveguide 102 is responsible for a different specific bandwidth around a given center frequency (e.g.: 100-200 MHz, 200-300 MHz, and 300-400 MHz), in one implementation.

The SAW transducers 110 typically are interdigital transducer (IDT) features fabricated from patterned metal films such conductive material including metals (e.g., aluminum, titanium, or gold), conductive polymers, or conductive oxides such as indium tin oxide (ITO). Patterning the SAW transducers 110 may be performed though photolithography (etching or lift-off), laser ablation of metal film, or direct-writing techniques such as described in Datta et al, *Direct-laser metal writing of surface acoustic wave transducers for integrated-optic spatial light modulators in lithium niobate*, Proc. SPIE Adv. Fab. Tech. for Micro/Nano Optics and Photonics X, 10115 (2017). Each SAW transducer 110 is fabricated with separate drive signal connections, allowing for each to be individually addressed, in one implementation. In another implementation, each a line of SAW transducers of the electro-holographic light field generator 300 of FIGS. 2 and 3, or other group of transducers, is fed with a common RF signal.

As shown in FIGS. 4B and 4C, in specific embodiments, pairs of optical modulators 100-E/100-F and 100-G/100-H may be arranged along a shared waveguide 102, where one of the optical modulators 100-E, 100-G in each pair is directed along the directional reference line 306, and one of the optical modulators 100-F, 100-H in each pair is directed against the directional reference line 306. In such an embodiment, the modulators 100 across the extent of the device 300 shown in FIGS. 2 and 3 are paired in this way.

For example, the optical modulators 100 in each pair may share a single common waveguide 102. Or pairs of optical modulators 100 may be arranged with waveguides 102 that are adjacent and parallel to each other, again with one of the optical modulators 100 directed along the directional reference line 306, and one of the optical modulators 100 directed against the directional reference line 306.

Optical modulators pairs may be packed relatively tightly with shared waveguides or separate waveguides, with a separation between the waveguides 102 of between 10 micrometers (µm)-1000 µm, for example, 50 µm. The waveguide length may be 1-10 centimeters (e.g., 5 cm) or even longer if multiple SAW transducers 110 and/or multiple light in-coupling devices 106 are used to mitigate acoustic and optical attenuation respectively. In this context, a greater waveguide length reduces system complexity and, if tiled into a larger display, it minimizes tile-borders ("grout"). Since the SAW 140 moves at the speed of sound, the light sources 402 may be strobed at a repetition rate equal to or lower than the inverse acoustic transit time, at a pulse width sufficiently narrow (for example, in the range of nanoseconds to microseconds) to cause acceptably low blurring.

Each waveguide 102 of the electro-holographic light field generator 300 of FIGS. 2 and 3 may be configured for a single specific wavelength of input light, which in this context should be understood to include at least one of visible light, infrared light and ultraviolet light, or for multiple different light wavelengths. For example, for 3D display applications, each waveguide 102 may carry one or more wavelengths of infrared, red, green, blue or ultraviolet light. In other specific light field generation applications, other wavelength combinations may be useful including more or fewer than three colors and/or non-visible wavelengths.

For each SAW optical modulator 100, there are one or multiple output couplers. In the examples of FIGS. 4A and 4B, the output couplers are micro-mirrors 410 formed, such as deposited, on angled endfaces 170 of each of the SAW modulator 100. In the illustrated example, an edge-cut angle β of the endfaces 170 relative to the proximal face 160 is approximately 45 degrees.

The output couplers are distributed along the waveguide 102 and adjacent to the output coupling region 102-O and configured for reflecting the leaky mode fan of exit light 150 as an output fan beam that is directed out of the plane from the optical substrate 120 at an output angle towards a display viewer. In the illustrated embodiments, the output fan beam is directed in a range of angles around perpendicular to the plane of proximal face 160 of the substrate 120. The micro-mirrors 410 are configured at an angle (typically less than 45 degrees) such that, for a pair of optical modulators 100-E, 100-F, each side handles half of the total field of view (FOV) of the output fan beam 150. In one example, the mirrors 410 are at about 40 degrees, i.e., less than 45 degrees, so that rays 162 from modulator 100-E have some "margin" of being reflected into the region labelled "B" and rays 162 from modulator 100-F are reflected into the region labeled "A", to provide some overlap between the output fans of each of the two modulators in a pair.

An RF controller 405 includes at least one hardware implemented processor device which provides control instructions to translate a desired 3D image into an appropriate RF waveform to the SAW transducer 110 of each optical modulator pair for the device 300 to develop the output fan beams 150 as a multiplexed three-dimensional output light field. For example, the output fan beams 150 may specifically be perpendicular to the optical substrate 120. Software for driving electro-holographic displays of a variety of forms is described, for example, in Mark Lucente, *Computational holographic bandwidth compression*, IBM Systems Journal, 35(3 & 4), 349-365 (1996); Quinn et al., *Interactive holographic stereograms with accommodation cues*, Practical Holography XXIV: Materials and Applications, ed. Hans I. Bjelkhagen and Raymond K. Kostuk, SPIE (2010); and Jolly et al., *Computation of Fresnel holograms and diffraction-specific coherent panoramagrams for full-color holographic displays based on leaky-mode modulators*, Proc. SPIE Practical Holography XXIX, 9386, 93860A (Mar. 10, 2016).

Once the RF controller 405 determines how much light needs to be put into a given view of a given pixel, it then determines what RE waveforms need to be applied to the SAW transducers 110 to produce that outcome. For example, the RF controller 405 may do a computational back-propagation of that light via the micro-mirror output couplers 410 and back into the corresponding waveguide 102. The computational interference between that back-propagated light and the waveguide light finally determines a specific SAW waveform to be used. In specific embodiments, the back-propagation can be pre-computed into a lookup table.

Figure 5:
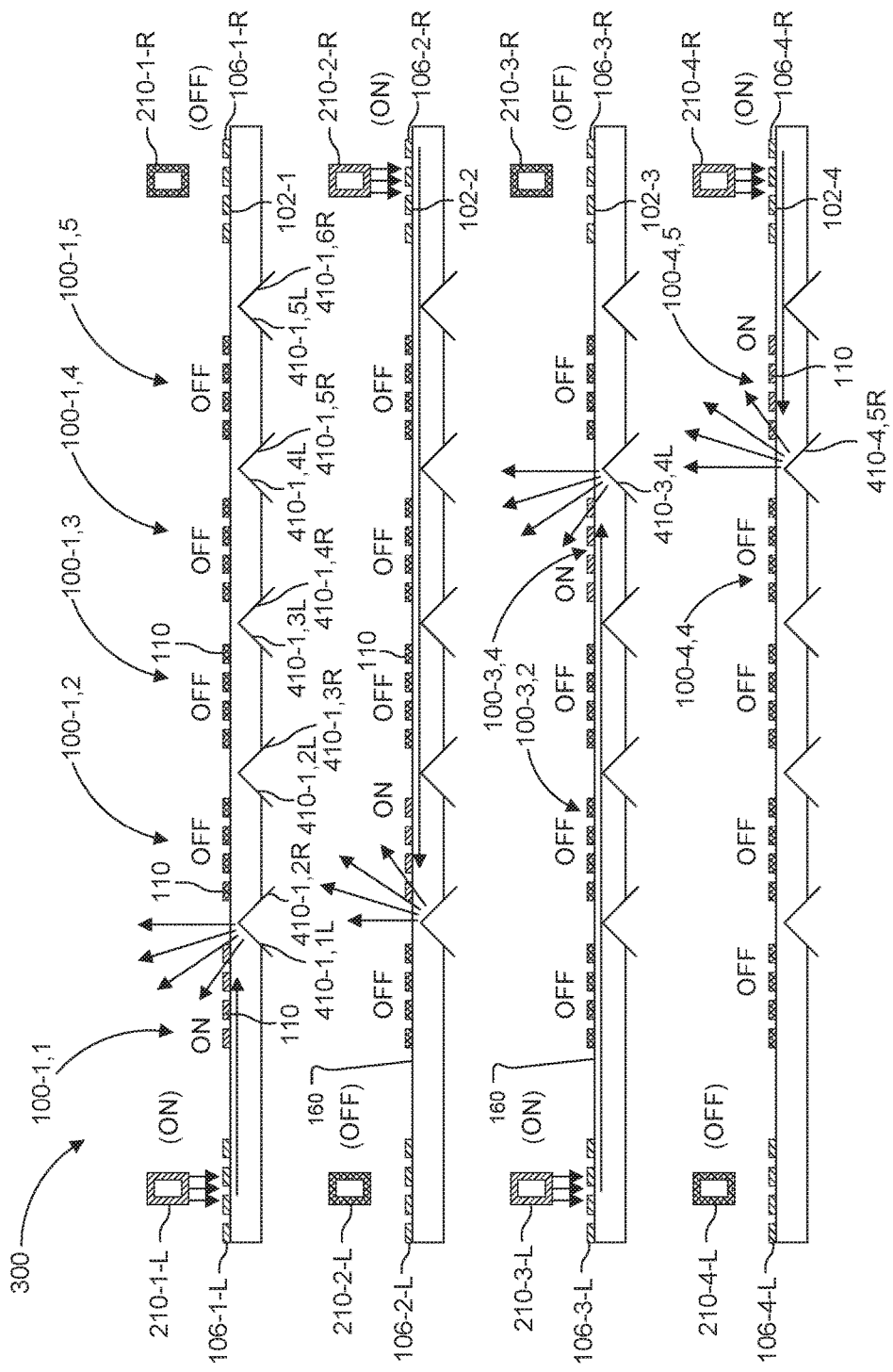
FIG. 5 is a schematic diagram showing the lines of modulators and their shared waveguides of a light field generator device, where each line of modulators is shown in side cross-section to illustrate their time-multiplex operation, according to the present invention.

FIG. 5 schematically shows an array of SAW modulators of an electro-holographic light field generator 300 and one possible mode of operation. The illustrated example as four rows of modulators and five columns of modulators (denoted 100-[row], [column]). Each line is shown in cross-section to illustrate the operation.

In more detail, in the illustrated light field generator 300, there are four shared waveguides 102-1, 102-2, 103-3 and 102-4. It should be noted, however, that in other embodiments, each of these waveguides 102-1, 102-2, 103-3 and 102-4 might actually be a pair of closely spaced waveguides that carry light in opposite directions with respect to each other.

Light is coupled into the each of these waveguides 102 via left and right in-coupling devices. For example, for shared waveguide 102-1, there is a left in coupling device 106-1-L and a right in-coupling device 106-1-R.

Then, for each shared waveguide 102, there are a series of SAW modulators 100. For example, for the top shared waveguide 102-1, there are SAW modulators 100-1,1 to 100-1,5.

Each of these SAW modulators has an associated SAW transducer 110, and one or two output couplers. In the illustrated example, the output couplers are micro-mirrors 410. However, in other embodiments, different output couplers could be used such as gratings, volume gratings, discrete optics, or the like.

For example, the end SAW modulators, such as 100-1,1 have a single output coupling mirror 410-1,1, in the illustrated embodiment. On the other hand, SAW modulators that are not on the end have two associated output couplers. For example, SAW modulator 100-1,4 has a left output coupler 410-1,4L and a right output coupler 410-1,4R. Thus, depending on the direction of light propagation in the shared waveguides 102, most of the SAW modulators can output light at either of their two output couplers.

Also illustrated is how the electro-holographic light field generator 300 employs time-multiplexing of multiple light inputs, multiple SAW transducers, and multiple output couplers. This can be used to piecewise scan a single line of a 3D display system according to an embodiment of the present invention.

In more detail, the specific light output couplers is chosen through coordinating the timing of the light inputs and the energization of the SAW transducers so that inactive SAW transducers can be in the OFF state (not necessarily required, but reasonable for power management reasons), and the light from the selected waveguide interacts with the SAW generated by the one or more ON SAW transducer(s). The SAW from the ON transducer then deflects the waveguide light into the leaky mode fan and to an output coupler.

The duty cycle and phase (time-synchronization) of the input light in this arrangement is controlled to be low duty cycle and synchronized with the velocity of the corresponding SAW so that the waveguide is illuminated at least for the window of time during which the SAW will diffract the waveguide light to the appropriate intended output coupler. (Again, the SAW transducer could be active beyond that time window, but for power management reasons probably would not).

Alternatively, a different embodiment might run multiple SAWs transducers at once and adjust for the variation in intensity as the light is deflected by each subsequent SAW.

For example, in the illustrated example, the light source 210-1-L is "on" to generate light that is to be coupled into the shared waveguide 102-1 via the left input-coupler 106-1-L. At the same time, a RF drive signal is delivered to the SAW transducer 110 of SAW modulator 100-1,1 so that the light in the waveguide 102-1 is deflected to exit the proximal face 160 of the device 300 via output coupler 410-1,1L.

In a similar way, input optical source 210-4-R is also activated to generate light that is coupled into waveguide 102-4 by input coupler 106-4-R. At the same time, an RF drive signal is delivered to the SAW transducer 110 of the SAW modulator 100-4,5 so that light is deflected by the output coupler 410-4,5-R to also exit the proximal face 160 of the device 300.

In a further example, input optical source 210-3-L is also activated to generate light that is coupled into waveguide 102-3 by input coupler 106-3-L. At the same time, an RF drive signal is delivered to the SAW transducer 110 of the SAW modulator 100-3,4 so that light is deflected by the output coupler 410-3,4-L to also exit the proximal face 160 of the device 300.

Figure 6:
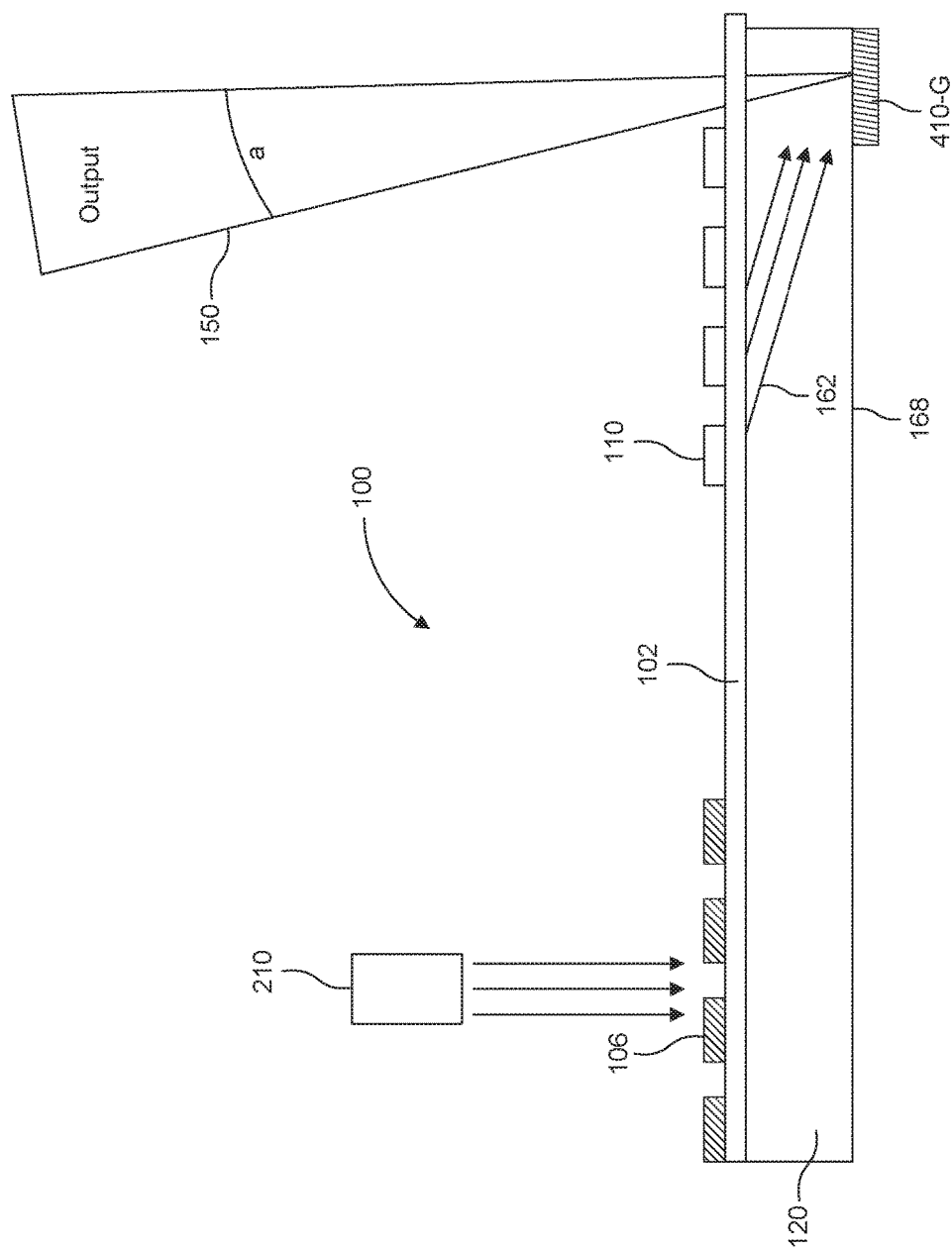
FIG. 6 is a side cross-sectional view of a SAW optical modulator in the light field generator device using a surface grating output coupler.

FIG. 6 shows a side cross-sectional view of an electro-holographic light field generator according to an alternative embodiment of the present invention which uses a surface gratings output coupler 410-G fabricated on the distal face 168 of the optical substrate 120 instead of micro-mirror structures described earlier. In general, in the previously discussed light field generator 300 of FIGS. 2 and 3, the surface grating 410-G could be substituted for micro-mirrors 412.

The surface gratings output coupler 410-G can be fabricated via standard photolithography or laser writing processes such as in Taillaert et al., *An out-of-plane grating coupler for efficient butt-coupling between compact planar waveguides and single-mode fibers*, IEEE Journal of Quantum Electronics 38.7 (2002): 949-955, which is incorporated herein by reference in its entirety. Further descriptions of exemplary generic algorithms and numerical grating optimization techniques may be found in:

Zhou et al., Genetic local search algorithm for optimization design of diffractive optical elements, Appl. Opt., vol. 38(20), pp. 4281-90 (1999);

Lin et al., Optimization of random diffraction gratings in thin-film solar cells using genetic algorithms, Solar Energy Materials and Solar Cells, vol. 92(12), pp. 1689-96 (2008);

Qing et al., Crowding clustering genetic algorithm for multimodal function optimization, Appl. Soft Computing, vol. 8(1), pp. 88-95 (2008);

Taillaert et al., Compact efficient broadband grating coupler for silicon-on-insulator waveguides, Opt. Lett., vol. 29(23), pp. 2749-51 (2004);

Shokooh-Saremi et al., Particle swarm optimization and its application to the design of diffraction grating filters, Opt. Lett., vol. 32(8), pp. 894-96 (2007); and Byrnes et al., Designing large, high-efficiency, high-numerical-aperture, transmissive meta-lenses for visible light, Opt. Exp. 24 (5), pp. 5110-5124 (2016).

Figure 7:
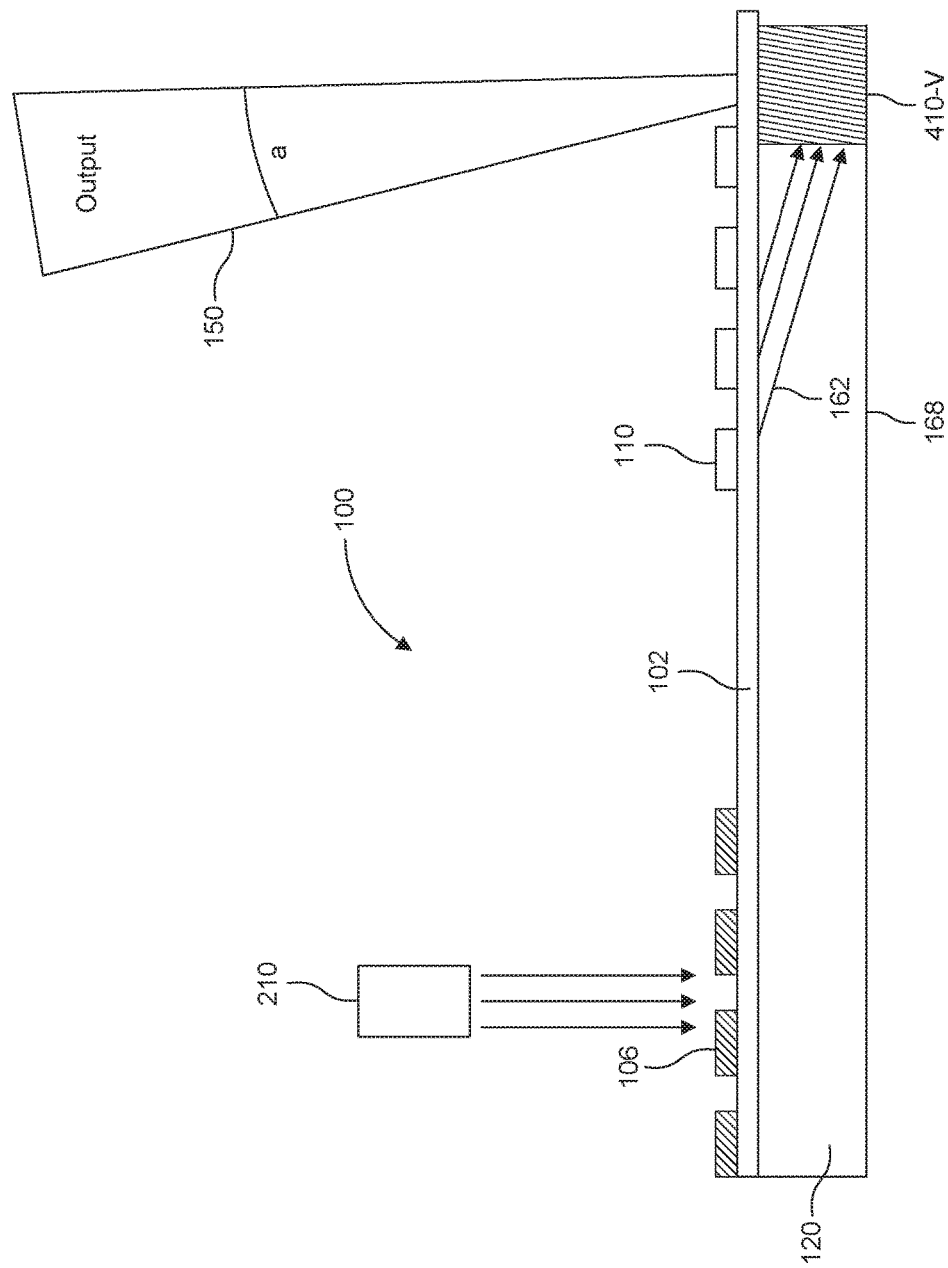
FIG. 7 is a side cross-sectional view of a SAW optical modulator in the light field generator device using a volume grating output coupler.

FIG. 7 shows a side cross-sectional view of one side of a SAW modulator of an electro-holographic light field generator 300 according to another embodiment of the present invention. Here volume gratings output coupler 410-V formed in the optical substrate 120 is used as the output couplers. Volume gratings 410-V can be configured for multi-wavelength composite response and have higher diffraction efficiency than thinner surface gratings. These volume gratings 410-V can be fabricated via known interference photolithography (holographic recording) or laser writing by processes such as described in Guo et al., *Design of a multiplexing grating for color holographic waveguide*, Optical Engineering 54.12 (2015): 125105-125105, (see pp. 1223); and in Gattass and Mazur, *Femtosecond laser micromachining in transparent materials*, Nature photonics 2.4 (2008): 219-225.

Figure 8:
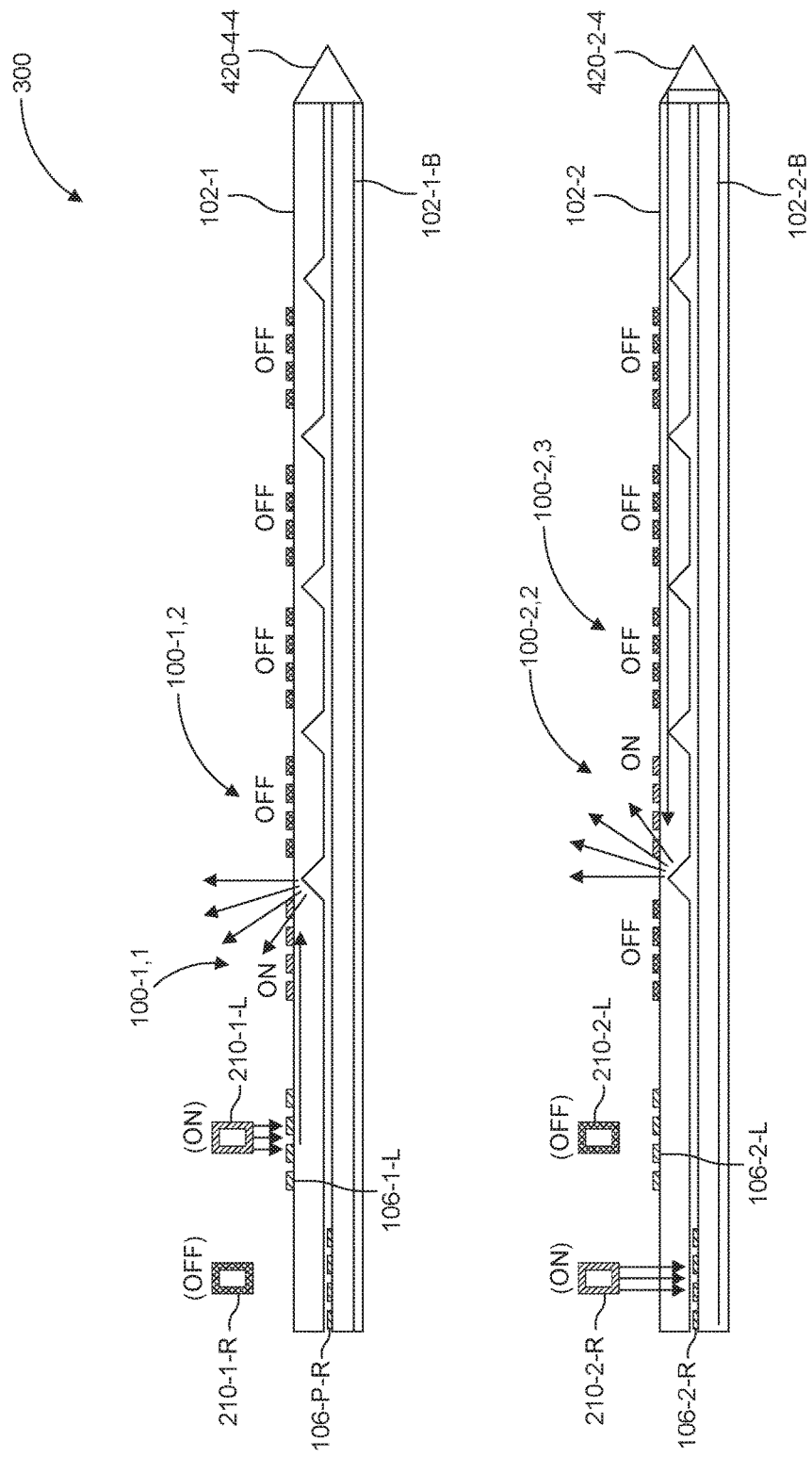
FIG. 8 is a schematic diagram showing the lines of modulators and their shared waveguides of a light field generator device, where each line of modulators is shown in side cross-section to illustrate their operation in which the light field generator device has a folded light path to scan a single line according to an embodiment of the present invention.

FIG. 8 schematically shows an array of SAW modulators of an electro-holographic light field generator 300 that employ a folded light path to scan each single line of the light field generator 300 according to an embodiment of the present invention.

Optical out-of-plane coupling elements 420 (e.g., a micro-fabricated prism or mirror) enables single-edge illumination of the electro-holographic light field generator device 300. Arranging the light inputs and the associated in-coupling devices 106 along a single edge of the optical substrate 120 may simplify the display connections and allow for a single spatial light modulator (SLM) to be used to address all of the light inputs. Micro-fabricated out-of-plane coupling elements 420 can be fabricated though known processes such as described in Van Erps et al., *Discrete out-of-plane coupling components for printed circuit board-level optical interconnections*, IEEE Photonics Technology Letters 19.21 (2007): 1753-1755, which is incorporated herein by reference in its entirety.

In the illustrated example, optical source 210-1-L is activated to couple light into the shared waveguide 102-1 via input coupler 106-L-1. SAW modulator 100-1,1 is active to deflect that light out of the device 300, through its proximal face.

On the other hand, as illustrated in the second line of the device 300, the right side optical source 210-2-R is actually located on the left side to couple light into the shared waveguide 102-2 via the input coupler 106-R-2. This input light is transmitted along the backside portion of the shared waveguide 102-2-B. It is then coupled into the front side portion of the shared waveguide 102-2 via the coupler 420-2. It is then transmitted down the front side portion of the waveguide 102-2 to the SAW modulator 100-2,2, where it is coupled out of the waveguide 102-2 and through the proximal face of the device 300 due to the SAW generated by that modulator's transducer 110.

Figure 9:
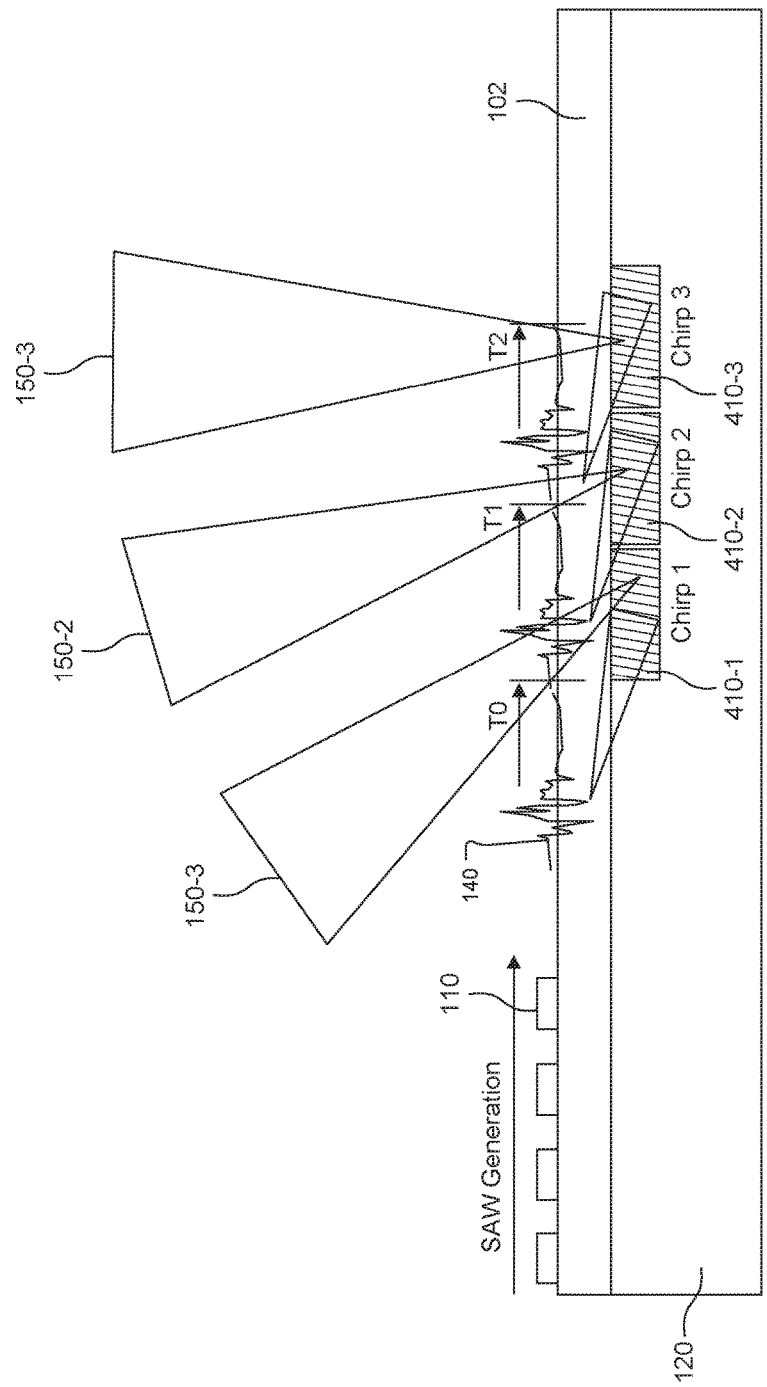
FIG. 9 is a side cross-sectional view of a SAW optical modulator in the light field generator device using series of chirped volume grating output couplers.

FIG. 9 shows a side cross-sectional view of one side of an electro-holographic light field generator according to an alternative embodiment of the present invention where output couplers each may comprise multiple chirped grating output couplers 410 arranged with adjacent grating structures being mapped to different wedges of output angles in the output light field 150.

This effectively spreads the output light field 150 across a larger area to increase the FOV of the display. Each individual chirped grating output coupler 410-1, 410-2, 410-3 can be selected by the RF controller 405 by controlling the SAW/light pulse timing. This approach trades off temporal bandwidth (display refresh rate) for a higher FOV.

Figure 10A:
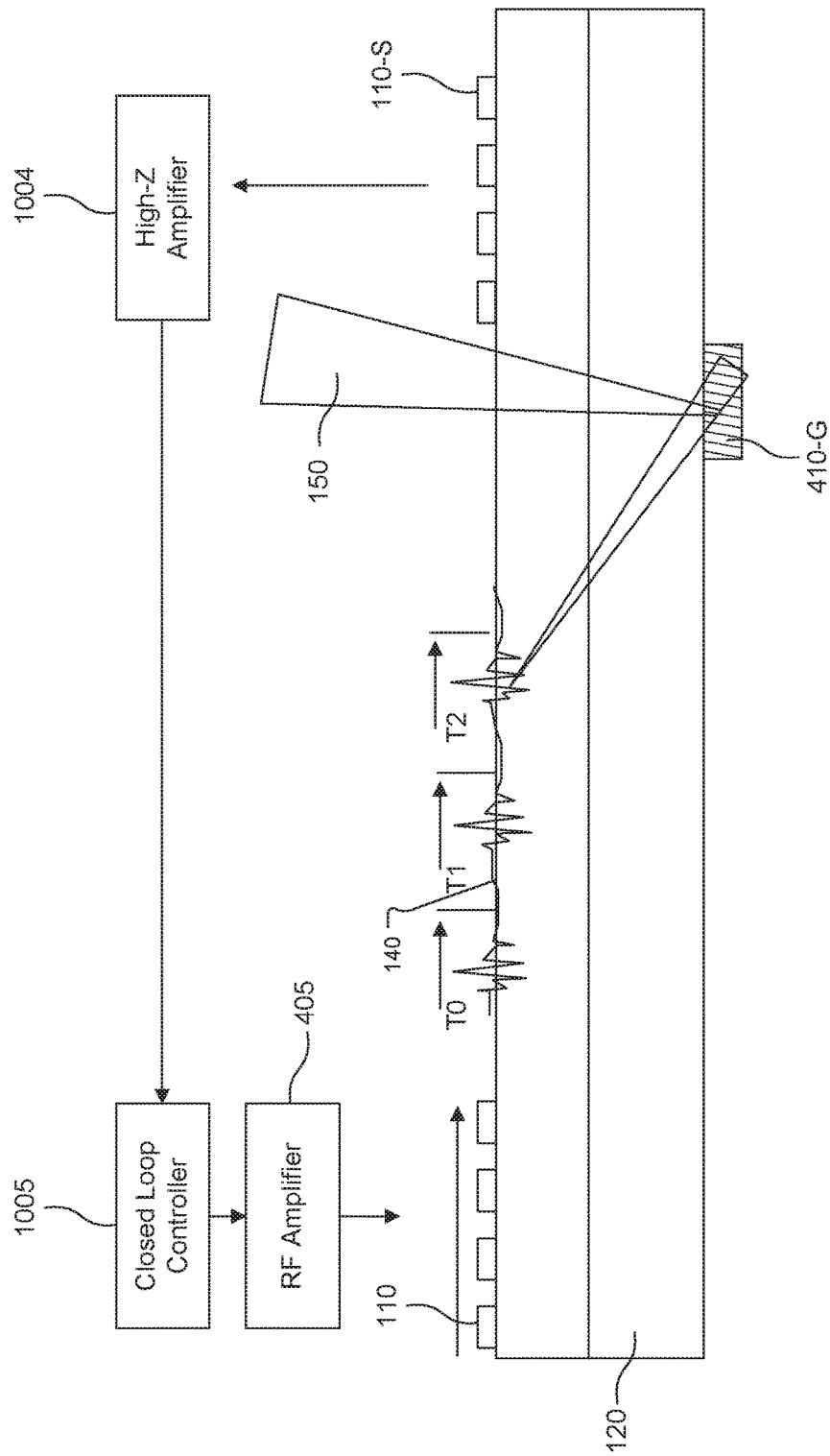
FIG. 10A is a side cross-sectional view of a SAW optical modulator in the light field generator device having a sensing transducer for detecting SAWs in the substrate.

FIG. 10A shows a side cross-sectional view of an electro-holographic light field generator according to another embodiment of the present invention configured to address changes in the waveguide propagation that occur due to thermal and other effects. Such changes in waveguide propagation time will affect the reflection angle of the output coupler grating 410-G and the resulting output light field 150. This can be addressed by adding one or more SAW sensing transducers 110-S for each optical modulator pair that are arranged over the waveguide of the optical substrate 120. These SAW sensing electrodes 110-S, which are IDTs in one example, provide a feedback signal that can be used to more precisely time subsequent light pulses in a closed-loop manner. Specifically, a high-Z amplifier 1004 then amplifies the small electrode feedback signal (microvolts to millivolts), and closed loop controller 1005 and RF controller 405 then coordinate the timing of the light input and the RF drive signal that creates the SAW signal 140. Such a closed loop timing arrangement allows elimination of baseline drift due to thermal drift or other material properties that change over time.

More specific discussion of the use of such IDT sensing electrodes is set forth in Benes et al., *Comparison between BAW and SAW sensor principles*, IEEE transactions on ultrasonics, ferroelectrics, and frequency control 45.5 (1998): 1314-1330.

In general, the sensing transducers 110-S are placed with known locations and orientations on the substrate 120. Typical distances of the sensing transducers 110-S to one or more SAW transducers 110 that induce surface acoustic waves would be on the 5-20 mm range, but could be as close as 0.1 mm, or as far as 100 mm.

In a more typical case, the SAW transducers 110 and sensing transducers 110-S would be on either end of a waveguide 102.

The sensing transducers 110-S could either be just beyond the waveguide (i.e., the waveguide is between, but not under them) or the waveguide could extend beneath one or both of them.

In some embodiments, the sensing transducers 110-S are chirped, i.e., there is a change in spatial frequency of their fingers along the transducer's length. Then they could either be pointed towards or away from each other, or in the same direction.

In other embodiments, roles of the sensing transducers 110-S and the SAW transducers 110 could be shared, such that at different points in the operation of the device 300 some of the transducers would function in a sensing mode whereas other transducers function in a SAW generation mode, followed by swapping of roles.

Figure 10B:
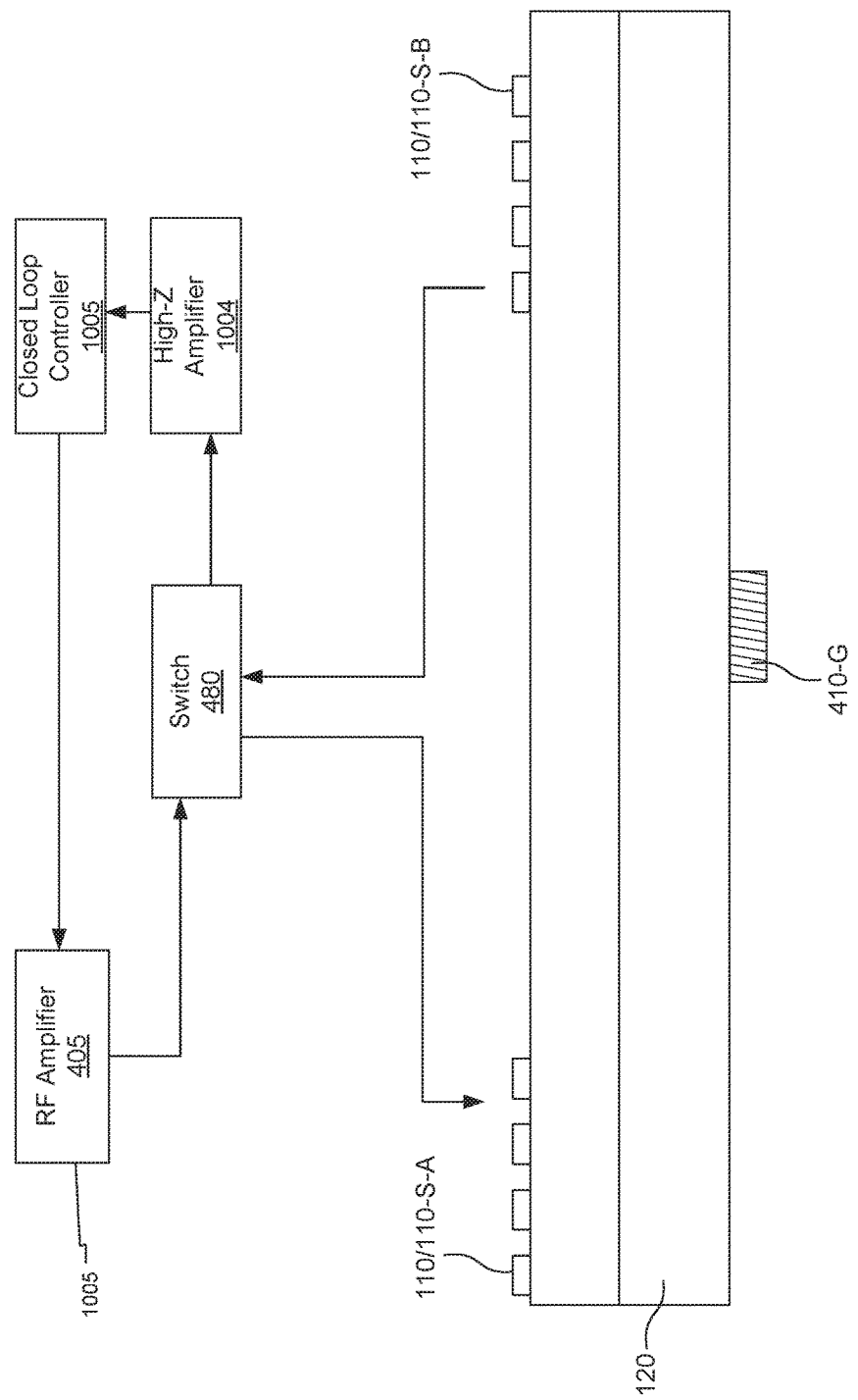
FIG. 10B is a side cross-sectional view of a SAW optical modulator in the light field generator device in which the transducers can function with in a SAW generation mode or a SAW sensing mode by the incorporation of a mode switch.

FIG. 10B shows an embodiment that has a switch 480 between the RF amplifier 405 and the high-Z amplifier 1004. Specifically, the switch 480 allows the RF amplifier 405 to drive either one of the transducers 110/110-S-A, 110/110-S-B of the modulator 100. As a result, either one of the transducers 110/110-S-A, 110/110-S-B may function in a SAW generation mode when driven by the RF amplifier 405. Then the other transducer will function in a SAW sensing mode in which it is connected to the high-Z amplifier 1004 by the switch 480. Then, the switch 480 can swap the two roles of those transducers so that the transducer that was in SAW sensing mode is now in SAW generation mode, and the transducer that was in SAW generation mode is now in SAW sensing mode.

Generally, the sensing transducers 110-S are be used to modulate or calibrate the amplitude profile of the SAW modulators 110, as to better induce surface acoustic waves with the desired amplitude, and also correct for variations due to thermal environmental changes, or aging, or photorefractive damage.

Still another mode is noise-cancelling/SAW cancelling/active damping mode. In physically small devices 300, SAW back-reflections, occuring from chip edges and other features, exist and are problematic. There can be crosstalk between adjacent modulators. This SAW noise is sensed by the sensing transducers 110-S and then the sensing transducers 110-S or the SAW transducers 110 or dedicated noise damping transducers are driven with the "opposite" (i.e., 180 degrees out of phase) signal in order to quench the SAW noise. In general, this can be done in a feedback or feedforward configuration. A hybrid feedback/feedforward system could also be used. The SAW velocity can be well-measured, so the SAW can be squelched or damped with the same IDT that senses it, or with a different IDT nearby.

Figure 11:
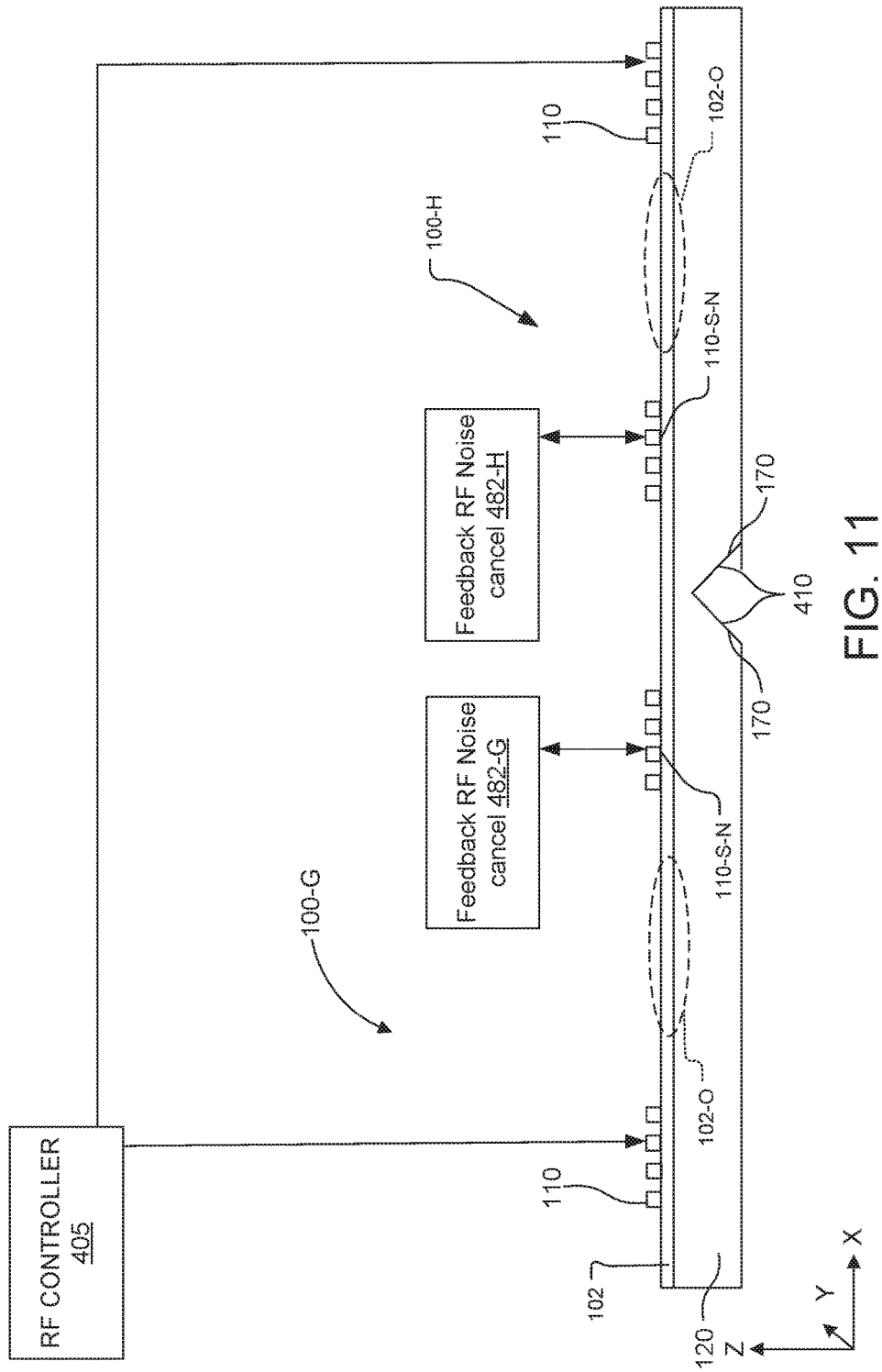
FIG. 11 is a side cross-sectional view of a cooperating pair of SAW optical modulators with feedback SAW dampening.

FIG. 11 shows an embodiment that uses a feedback noise cancellation/SAW dampening system. Specifically, an exemplary pair of SAW modulators 100-G and 100-H are shown from the electro-holographic light field generator device 300, as previously discussed. These SAW modulators 100-G, 100-H have their respective SAW transducers 110 and output coupling regions 102-O of the waveguide 102 at which the light is diffracted out of the waveguide 102 by the SAWs generated by the SAW transducers 110.

Also provided are SAW sensing and noise reduction/dampening transducers 110-S-N. Specifically, each of the modulators 110-G in 110-H has respective sensing and noise reduction transducers 110-S-N. These are driven by feedback RF noise cancellation circuits 182-G and 182-H. Specifically, these circuits 182-G, 182-H detect the SAWs as generated by the respective transducers 110 and then are driven by the feedback RF noise cancellation circuits 182-G, 182-H to suppress or dampen the noise or any other parasitic SAW noise that they detect. Specifically, sense transducers/IDTs will sense the acoustic (mechanical) waves (SAWs) in the form of electric fields induced by the piezoelectric properties of the substrate 120. Then the feedback circuits 182-G, 182-H will drive those sense transducers/IDTs 110-S-N or other transducers to dampen those SAWs.

Figure 12:
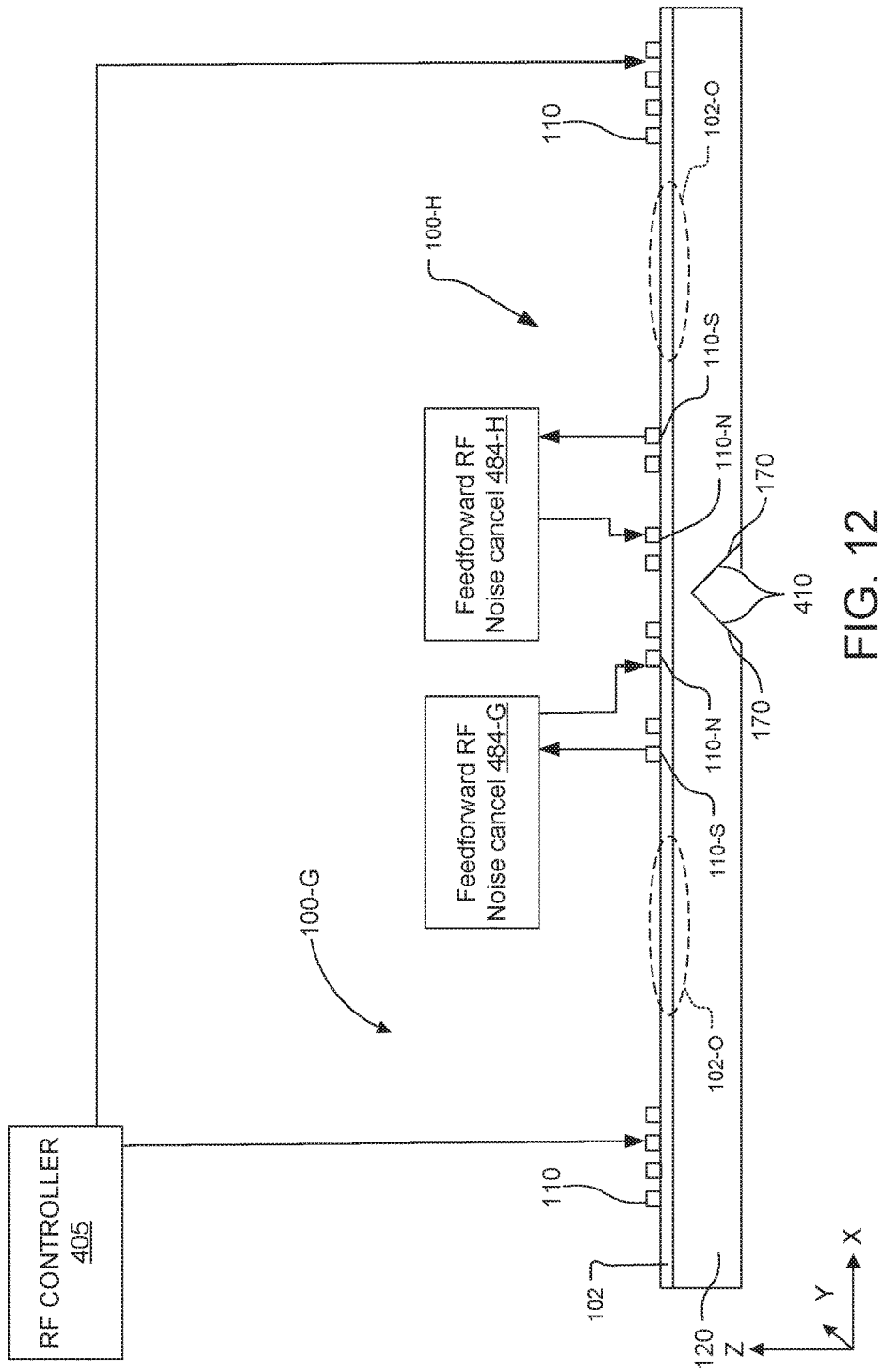
FIG. 12 is a side cross-sectional view of a cooperating pair of SAW optical modulators with feedforward SAW dampening.

FIG. 12 shows an embodiment that uses a feedforward noise cancellation system. Specifically, in this embodiment, there are separate sense transducers 110-S and noise suppression transducers 110-N downstream of the output coupling regions 102-O of the waveguide 102, for each of the adjacent SAW modulators 100-G, 100-H.

In general, the sense acoustic (mechanical) waves in the form of electric fields detect the SAWs typically generated by the respective SAW modulators 110 via their sense transducers/IDTs 110-S. Specifically, the IDTs sense acoustic (mechanical) waves in the form of electric fields induced by the piezoelectric properties of the substrate 120. They then drive the noise cancellation/SAW dampening transducers 110-N with the inverse signal corrected for the phase delay between the sense transducers 110-S and the noise cancellation transducers 110-N. This will help to cancel or damped these SAW signals after they have propagated through the output coupling region 102-O and thereafter would simply contribute to noise and crosstalk.

Figure 13:
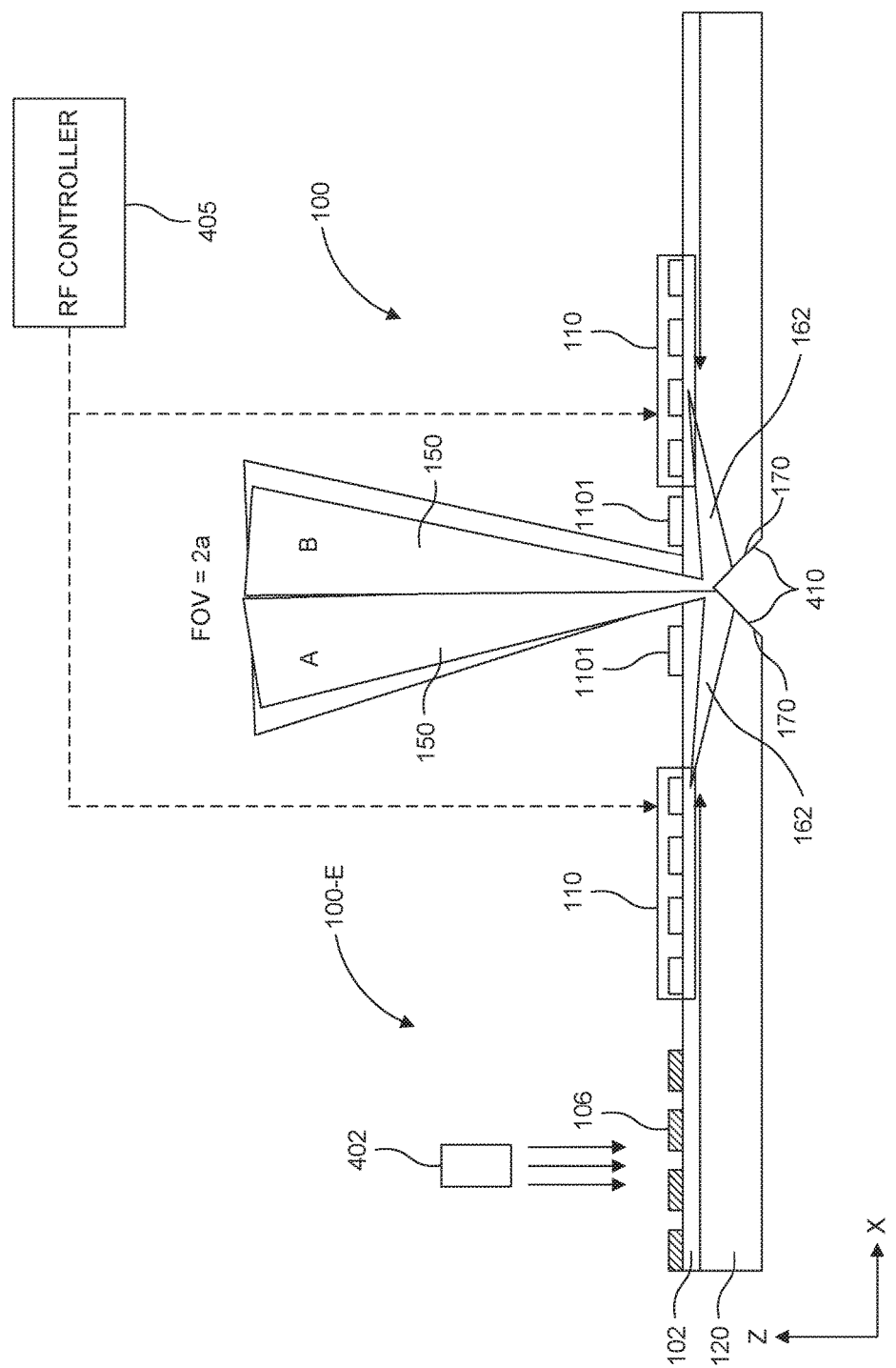
FIG. 13 is a side cross-sectional view of a pair of SAW optical modulators in the light field generator device employing patterned viscoelastic surface material to reduce crosstalk.

FIG. 13 shows a side cross-sectional view an electro-holographic light field generator according to an alternative embodiment of the present invention. This embodiment includes patterned viscoelastic surface materials, SAW absorber material 1101 between the sites of the SAW transducers 110. These material islands are configured to absorb the remainder of each SAW 140, which thereby prevents crosstalk in adjacent sites that would otherwise result in blurring of the output images. The addition of such SAW absorber material 1101 allows the RF controller 405 to simultaneously operate the light input source 210 and SAW transducer 110 at each end of each optical modulator pair so that each light input 402 and corresponding SAW transducer 110 contributes to half the output field of view. Convenient materials to use for the SAW absorber material 1101 are polymers or oxides that can be patterned though standard microfabrication techniques such as described, for example, in Hamidon and Yunusa, *Sensing Materials for Surface Acoustic Wave Chemical Sensors*, Progresses in Chemical Sensor (2016).

There are reports in the existing literature of the field of increasing the angular subtense of a SAWs diffractive fan. But these reported techniques do not include the idea presented above of alternate firing of illumination on opposing sides or splitting the angular reach into "halves." For example, FIG. 8 of (Quaderi and Smalley, 2016) depicts two schemes for broadening the output fan that stacks devices together "front to front" and "back to back", and patterns waveguides and IDTs on both sides of an optical modulator, but amplitude variations as a function of angle suggest the need for alternative approaches.

Similarly, there are some research disclosures on linear array SAW devices (e.g., Jolly et al., *Near-to-eye electro-holography via guided-wave acousto-optics for augmented reality*, Proc. of SPIE Vol. Vol. 10127. 2017; incorporated herein by reference in its entirety), but no reference has been made to changing the propagation vector of light through a hardware implementation so as to double the display field of view.

Figure 14:
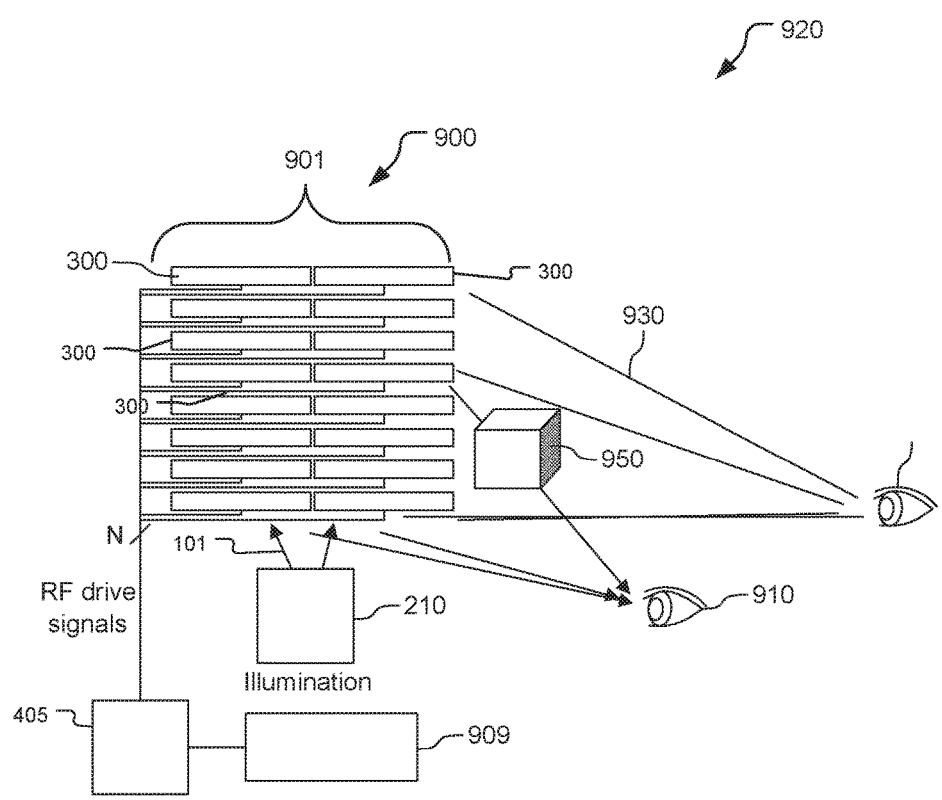
FIG. 14 shows a 3D display system that includes an electro-holographic 3D display and other components for powering and controlling the electro-holographic 3D display, where the display is formed from a dual-column stack of light field generator devices.

FIG. 14 shows a 3D display system 920. The 3D display system 920 includes an electro-holographic 3D display 900. The RF controller 405 and a processor 909 are also shown. Here, the electro-holographic light field generator devices 300 are arranged in a dual column stack 901.

Each of the electro-holographic light field generator devices 300 within the electro-holographic 3D display 900 receives a beam of input light 101 generated by illumination source 210. The illumination source 210 might be a laser such as a pulsed laser, to cite one of many possible examples of illumination light sources 210. The laser might illuminate the generator devices 300 together in a beam. Separate in-coupling prisms or gratings could be used to couple light into each of the separate waveguides formed in the devices.

The light field generator devices 300 are driven by the RF controller 405. The RF driver 405 is governed by processor 909 on the basis of typically digitized graphical data resident or derived in a format appropriate for the electro-optical subsystem of the light field display 900. The 3D display system 920 produces a modulated exit beam 930, in accordance with any of the teachings provided herein above, such that observers 910 in the far field perceive an object 950 to be projected in three dimensions.

It is also important to note that such light field generators 300, though described in the specific context of 3D display systems, also can usefully be applied to other applications such as optogenetics, 3D printing, cloaking, and near-eye displays for augmented reality/virtual reality (AR/VR).

Embodiments of the invention may be implemented in part in any conventional computer programming language such as VHDL, SystemC, Verilog, ASM, Python, C, C++, MATLAB etc. Alternative embodiments of the invention may be implemented as pre-programmed hardware elements such as, without limitation, combinations of one or more of a field-programmable gate array (FPGA), graphics processing unit (GPU), central processing unit (CPU) and other related components, or as a combination of hardware and software components.

Note that such light field generators, though described in the specific context of 3D display systems, also can usefully be applied to other applications such as optogenetics, 3D printing, cloaking, and near-eye displays for AR/VR.

While this invention has been particularly shown and described with references to preferred embodiments thereof, it will be understood by those skilled in the art that various changes in form and details may be made therein without departing from the scope of the invention encompassed by the appended claims.

What is claimed is:

1. A surface acoustic wave (SAW) optical modulator, comprising:
   a substrate;
   a waveguide in the substrate; and
   transducers for 1) generating SAWs for diffracting light out of the waveguide and into parts of the substrate outside the waveguide, and 2) sensing SAWs in the substrate.

2. A modulator as claimed in claim 1, further comprising separate SAW transducers and sense transducers.

3. A surface acoustic wave (SAW) optical modulator, comprising:
   a substrate;
   a waveguide in the substrate;
   transducers for generating SAWs for diffracting light out of the waveguide and sensing SAWs in the substrate; and
   a switch for operating the transducers in a SAW generation or SAW sensing mode.

4. A modulator as claimed in claim 1, further comprising a feedback circuit for driving the transducers to dampen SAWs in the substrate.

5. A modulator as claimed in claim 1, further comprising a feedforward circuit for driving the transducers to dampen SAWs in the substrate.

6. A modulator as claimed in claim 1, wherein the SAW modulators are directed in different directions.

7. A modulator as claimed in claim 1, wherein the transducers are upstream and downstream of an output coupling region of the waveguide.

8. A surface acoustic wave (SAW) optical modulator, comprising:
   a substrate;
   a waveguide in the substrate; and
   transducers for generating SAWs for diffracting light out of the waveguide and sensing SAWs in the substrate; and
wherein the transducers comprise SAW generation transducers, SAW sensing transducers and SAW dampening transducers.

9. A light field generator device, comprising:
   a substrate;
   an array of waveguides in the substrate; and
   an array of surface acoustic wave (SAW) modulators formed in the substrate, the SAW modulators including transducers for generating SAWs for diffracting light out of the waveguides and into parts of the substrate outside the waveguide and sensing SAWs in the substrate.

10. A method for controlling a SAW optical modulator, comprising:
    driving transducers for generating surface acoustic waves (SAWs) for diffracting light out of a waveguide formed in a substrate and into parts of the substrate that are outside the waveguide; and
    sensing SAWs in the substrate with the transducers.

11. A method as claimed in claim 10, further comprising using separate SAW transducers and sense transducers.

12. A method as claimed in claim 10, further comprising driving the transducers to dampen SAWs in the substrate in a feedforward configuration.

13. A method as claimed in claim 10, further comprising driving the transducers to dampen SAWs in the substrate in feedback configuration.

14. A method for controlling a SAW optical modulator, comprising:
    driving transducers for generating surface acoustic waves (SAWs) for diffracting light out of a waveguide;
    sensing SAWs in the substrate with the transducers; and
    switching the transducers to operate in a SAW generation or SAW sensing mode.

15. A method for controlling a SAW optical modulator, comprising:
    driving transducers for generating surface acoustic waves (SAWs) for diffracting light out of a waveguide; and
    sensing SAWs in the substrate with the transducers; and
wherein the transducers comprise SAW generation transducers, SAW sensing transducers and SAW dampening transducers.

16. A method for generating a light field, comprising:
    driving transducers on a substrate to generate SAWs to diffract light from waveguides to generate the light field;
    driving the transducers to dampen the SAWs in the substrate.

* * * * *